US 11,380,464 B2
Jul. 5, 2022

United States Patent
Li et al.

(54) SURGE ARRESTER AND ASSOCIATED MANUFACTURING METHOD

(71) Applicant: Hitachi Energy Switzerland AG, Baden (CH)

(72) Inventors: Chun Li, Beijing (CN); Ektor Sotiropoulos, Zurich (CH); Felix Greuter, Rütihof (CH); JianSheng Chen, Beijing (CN); Jian He, Beijing (CN); Liang Song, Beijing (CN); Weidong Zhou, Beijing (CN)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/962,603

(22) PCT Filed: Jan. 18, 2018

(86) PCT No.: PCT/CN2018/073192
§ 371 (c)(1),
(2) Date: Jul. 16, 2020

(87) PCT Pub. No.: WO2019/140586
PCT Pub. Date: Jul. 25, 2019

(65) Prior Publication Data
US 2020/0402690 A1    Dec. 24, 2020

(51) Int. Cl.
*H02H 1/00*     (2006.01)
*H02H 1/04*     (2006.01)
(Continued)

(52) U.S. Cl.
CPC ............... *H01C 7/12* (2013.01); *H01B 17/16* (2013.01); *H02H 9/04* (2013.01)

(58) Field of Classification Search
CPC ............ H01C 7/12; H01B 17/16; H02H 9/04
(Continued)

(56) References Cited

U.S. PATENT DOCUMENTS

| 4,899,248 A | * | 2/1990 | Raudabaugh | .......... H05K 5/069 |
| | | | | 361/127 |
| 5,684,665 A | * | 11/1997 | Rudy | ..................... H01C 7/126 |
| | | | | 361/117 |

(Continued)

FOREIGN PATENT DOCUMENTS

| CN | 1877752 A | 12/2006 |
| CN | 201289770 Y | 8/2009 |

(Continued)

OTHER PUBLICATIONS

International Search Report and Written Opinion of the International Searching Authority, PCT/CN2018/073192, dated Oct. 12, 2018, 9 WOpages.

*Primary Examiner* — Jared Fureman
*Assistant Examiner* — Lucy M Thomas
(74) *Attorney, Agent, or Firm* — Sage Patent Group

(57) ABSTRACT

A surge arrestor includes an active part extending along a longitudinal direction of the surge arrester, a first electrode having a first interlocking part, a second electrode resting against a second end of the active part, a flexible insulating housing, and a second interlocking part formed on an inner surface of the flexible insulating housing. The flexible insulating housing includes: a support member mechanically connecting and supporting the assembly of the first electrode, the active part and the second electrode, which has a plurality of supporting elements being arranged parallel to the longitudinal direction of the surge arrester and being arranged laterally at sides of the assembly of the first electrode, the active part and the second electrode, and an insulating expandable part with a plurality of sheds extending outwards, being moulded around the support member and being spaced apart from the assembly.

19 Claims, 8 Drawing Sheets

(51) Int. Cl.
*H02H 3/22* (2006.01)
*H02H 9/06* (2006.01)
*H01C 7/12* (2006.01)
*H01B 17/16* (2006.01)
*H02H 9/04* (2006.01)

(58) Field of Classification Search
USPC .......................................................... 361/117
See application file for complete search history.

(56) References Cited

U.S. PATENT DOCUMENTS

| | | | | |
|---|---|---|---|---|
| 6,185,813 | B1* | 2/2001 | Donnola | H01C 7/12 |
| | | | | 29/613 |
| 6,735,068 | B1 | 5/2004 | Hartman et al. | |
| 8,593,775 | B2 | 11/2013 | Gebhardt et al. | |
| 2006/0279895 | A1* | 12/2006 | Yamaguchi | H01C 7/126 |
| | | | | 361/118 |

FOREIGN PATENT DOCUMENTS

| | | |
|---|---|---|
| CN | 101916633 A | 12/2010 |
| CN | 206471177 U | 9/2017 |
| EP | 0372106 A1 | 6/1990 |
| EP | 0549432 A1 | 6/1993 |
| TW | 344830 B | 11/1998 |
| WO | 2011095590 A1 | 8/2011 |

* cited by examiner

SURGE ARRESTER AND ASSOCIATED MANUFACTURING METHOD

CROSS REFERENCE TO RELATED APPLICATIONS

This application is a 35 U.S.C. § 371 national stage application of PCT International Application No. PCT/CN2018/073192 filed on Jan. 18, 2018, the disclosure and content of which is incorporated by reference herein in its entirety.

TECHNICAL FIELD

Embodiments relate to an overvoltage protection resistor, and more particularly to a surge arrester and manufacturing method therefor.

BACKGROUND ART

Surge arrestors today are playing a very important role in protecting critical and expensive equipment, such as transformers, switching devices, and computing devices, from over-voltage conditions. Conventional surge arrester typically includes an outer insulating enclosure, a pair of electrodes at opposite ends of the enclosure for connecting the surge arrester between a line-potential conductor and ground, and multiple varistors stacked between the pair of electrodes for dissipating the surge current generated by the over-voltage condition.

Such surge arrestors, however, usually suffers from several disadvantages such as complicated fabrication and assembly process, high fabrication and material cost, and long production time. Therefore, it is desired in various application fields to have cost-effective, easy-to-fabricate/assemble, and high performance surge arrester.

Patent WO 2011095590 A1 discloses a surge arrester for a modular designed arrester system. The surge arrester has an active part and two electrodes are applied to the active part, where a connection element is made of an insulating material. The electrodes are fixed to the active part for electrical contact of the active part by the electrodes. The connection element is produced in an injection moulding method or press moulding method and shrinks during the production thereof, thereby firmly pressing the electrodes onto the active part. A drawback of such manufacture process may be that it would be inflexible, since the connection element, e.g. a housing, cannot be formed unless the active part and the electrodes are on-site.

BRIEF SUMMARY

According to one aspect, it provides a surge arrester, including: an active part extending along a longitudinal direction of the surge arrester, a first electrode having a first interlocking part, being arranged to rest against a first end of the active part, a second electrode resting against a second end of the active part, wherein the second end opposes the first end in the longitudinal direction of the surge arrester, a flexible insulating housing, being arranged around an assembly of the first electrode, the active part and the second electrode, and a second interlocking part formed on an inner surface of the flexible insulating housing. The first interlocking part of the first electrode is arranged to fit with the second interlocking part of the flexible insulating housing for preventing relative movement of the first electrode and the flexible insulating housing in the longitudinal direction of the surge arrester. The flexible insulating housing includes: a support member mechanically connecting and supporting the assembly of the first electrode, the active part and the second electrode, which has a plurality of supporting elements being arranged parallel to the longitudinal direction of the surge arrester and being arranged laterally at sides of the assembly of the first electrode, the active part and the second electrode, and an insulating expandable part with a plurality of sheds extending outwards, being moulded around the support member and being spaced apart from the assembly of the first electrode, the active part and the second electrode.

By having the surge arrester, a plurality of the supporting elements of the support member are mechanically connected by the insulating expandable part. The expandable material used for the insulating expandable part exhibits a relatively weak mechanical strength and expandable characteristic, providing a path between any two adjacent supporting elements for releasing a radial pressure generated inside the inner space defined by the supporting member. The overpressure may be generated due to a high short-circuit current especially for a high voltage system. Besides, the expandable characteristic of the insulating expandable part makes it possible to assemble the two individual parts as the flexible insulating housing and the assembly of the first electrode, the active part and the second electrode, resulting an increase in the flexibility of the surge arrester manufacture. In particular, because the support elements are mechanically connected by the flexible insulating housing, by exerting outwards radial force on the flexible insulating housing, the cross-section of its inner space is enlarged, thus making it easier to insert the assembly of the first electrode, the active part and the second electrode into the flexible insulating housing. When the assembly reaches the desired position, the exertion of the force is stopped and the flexible insulating housing may return to its original shape.

According to another aspect, it provides a method for manufacturing the surge arrester, including: moulding the insulating expandable part around the support member, expanding the flexible insulating housing, inserting the assembly of the first electrode, the active part and the second electrode into the expanded flexible insulating housing in a longitudinal direction of the surge arrester, and releasing the expanded flexible insulating housing so that it is arranged around the assembly of the first electrode, the active part and the second electrode.

According to another aspect, it provides a method for manufacturing the surge arrester, including: arranging the support member around the assembly of the first electrode, the active part and the second electrode, and moulding the insulating expandable part around the support member.

Such manufacture processes allow to have the two parts ready in the first place, namely the flexible insulating housing and the assembly of the first electrode, the active part and the second electrode, and then have them assembled so as to get the assembled surge arrester.

BRIEF DESCRIPTION OF THE DRAWINGS

The subject matter of the disclosure will be explained in more detail in the following text with reference to exemplary embodiments which are illustrated in the drawings, in which.

The reference symbols used in the drawings, and their meanings, are listed in summary form in the list of reference symbols. In principle, identical parts are provided with the same reference symbols in the figures.

DETAILED DESCRIPTION

Figure 1A:
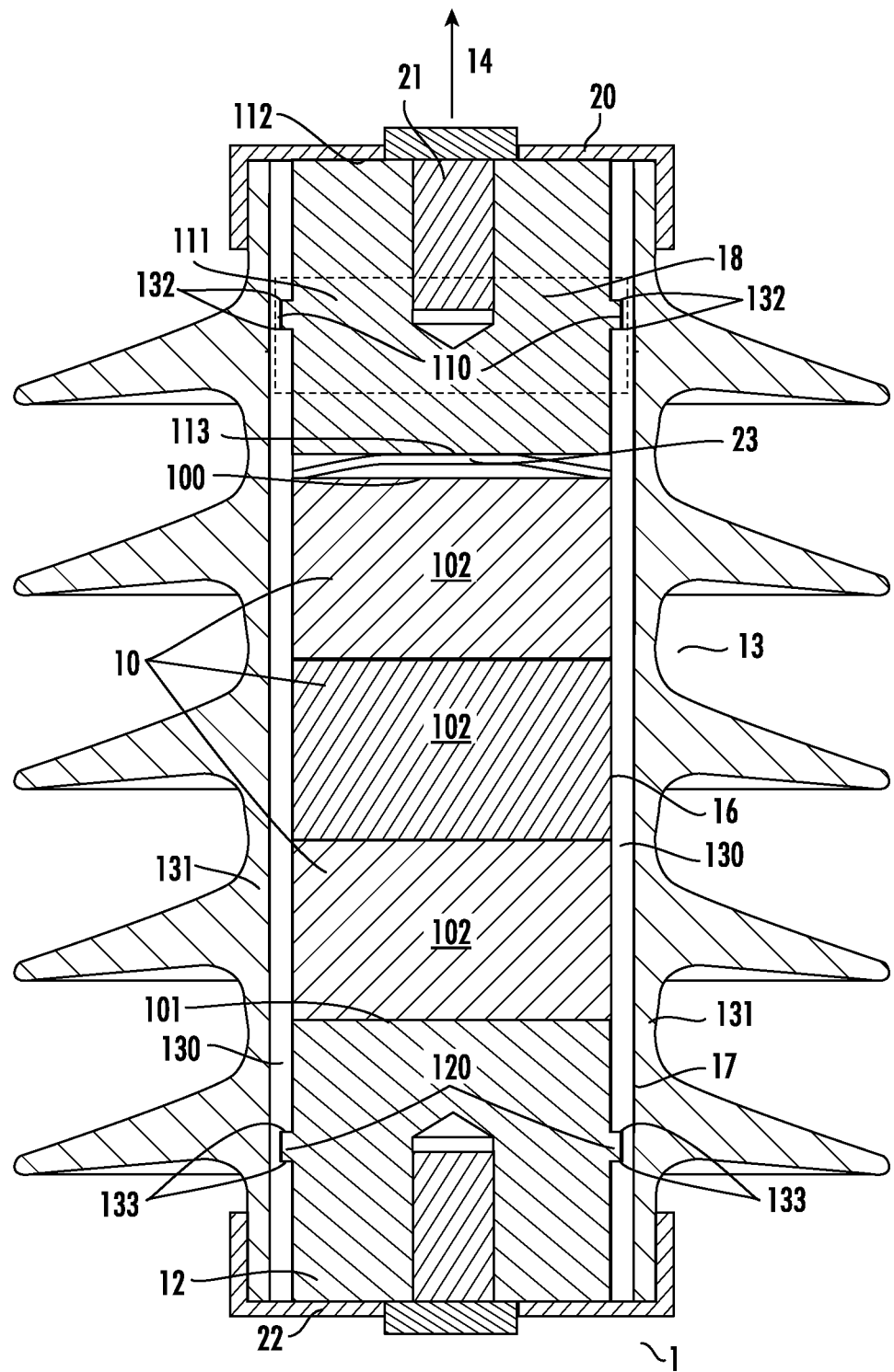
FIG. 1A shows a longitudinal section of a surge arrester according to an embodiment of present disclosure.

While embodiments are susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

FIG. 1A shows a longitudinal section of a surge arrester according to an embodiment of the present disclosure. As shown in FIG. 1A, the surge arrester 1 includes an active part 10, a first electrode 11, a second electrode 12, and a flexible insulating housing 13.

The active part 10 is arranged to extend along a longitudinal direction 14 of the surge arrester 1. For example, the active part 10 is substantially cylindrically shaped and arranged coaxially to a longitudinal axis of the surge arrester 1. The longitudinal axis 15 may denote a center axis and/or a cylinder axis of the surge arrester 1.

The first electrode 11 is arranged to rest against a first end 100 of the active part 10. The second electrode 12 is arranged to rest against and is in contact with a second end 101 of the active part 10, which second end 101 opposes the first end 100 in the longitudinal direction 14. Accordingly, the first electrode 11 and the second electrode 12 are spaced apart from one another along the longitudinal direction 14. Both the first electrode 11 and the second electrode 12 may be formed as disk-like and/or substantially circular cylindrical blocks of electrically conductive material, such as for example aluminium or any other appropriate metal or alloy. The first and the second electrodes 11, 12 may denote electrical terminals and or electrical taps, respectively.

The flexible insulating housing 13 is arranged around an assembly of the first electrode 11, the active part 10 and the second electrode 12. For this purpose, the flexible insulating housing 13 may include a support member 130 and an insulating expandable part 131 with a plurality of shed extending outwards. The support member 130 mechanically connects and supports the assembly of the first electrode 11, the active part 10 and the second electrode 12 by a second adhesive layer 16 bonding the assembly of the first electrode 11, the active part 10 and the second electrode 12 and the support member 130.

Figure 2:
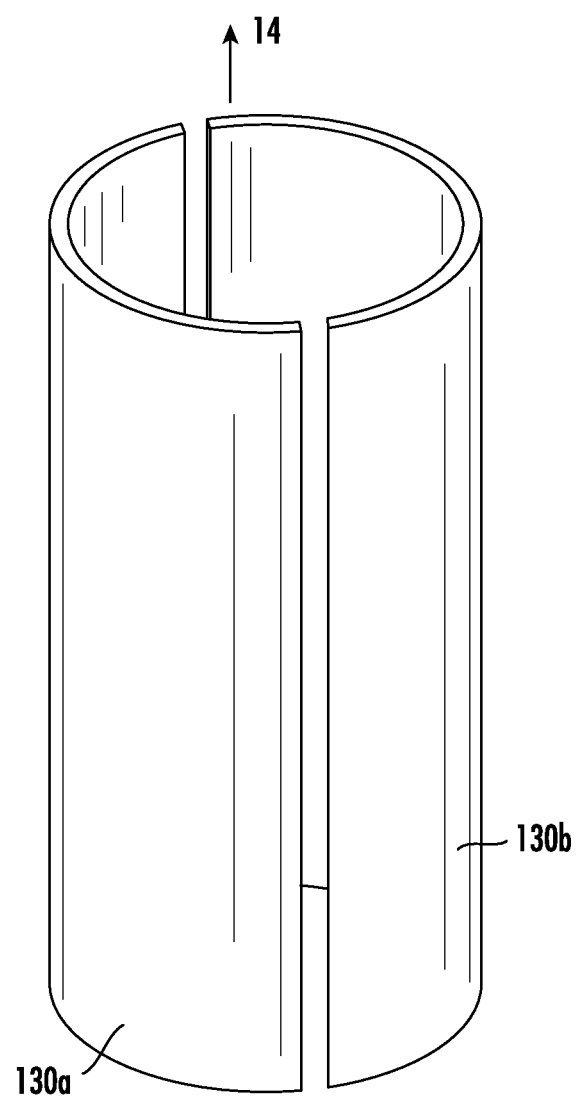
FIG. 2 shows a support member according to an embodiment of present disclosure.

FIG. 2 shows a support member according to an embodiment of the present disclosure. As shown in FIG. 1A and FIG. 2, the support member 130 includes a plurality of supporting elements 130a, 130b arranged parallel to the longitudinal direction 14 of the surge arrester 1. The plurality of supporting elements 130a, 130b are arranged laterally at sides of the assembly of the first electrode 11, the active part 10 and the second electrode 12. The plurality of supporting elements 130a, 130b may be manufactured from a thermoplastic material, duroplast-based FRP material, or unidirectional, tape or filament wound reinforced duro- or thermoplastic material. The support elements 130a, 130b are each connected with a first end to the first electrode 11 and with a second end opposing the first end in longitudinal direction 14 to the second electrode 12.

Figure 3A:
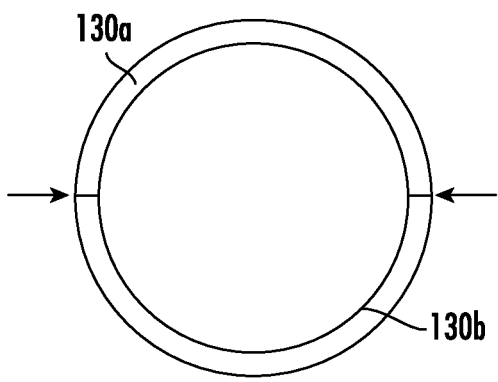
FIGS. 3A to 3E each shows a cross-section of a support member according to an embodiment of the present disclosure.
Figure 3B:
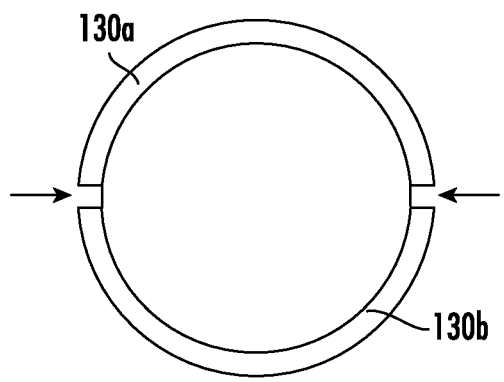
Figure 3C:
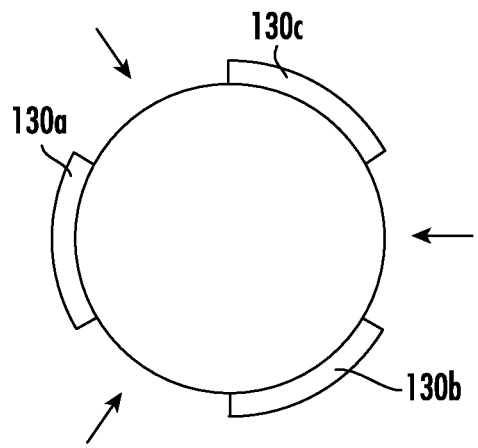
Figure 3D:
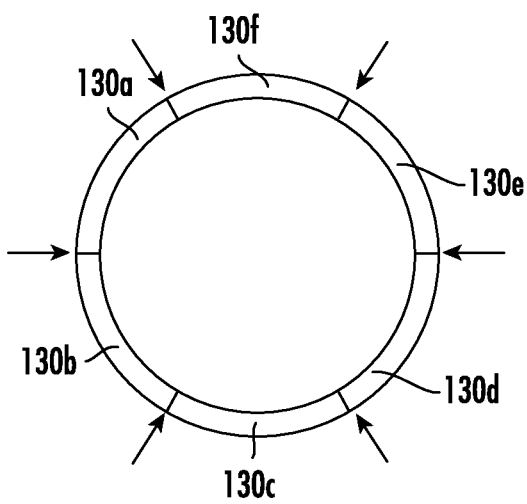
Figure 3E:
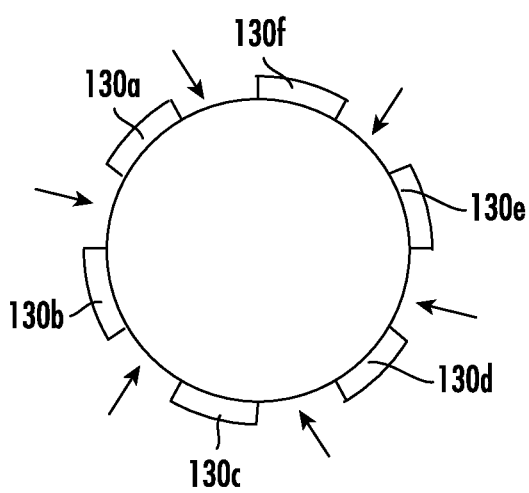

FIGS. 3a to 3e each shows a cross-section of a support member according to an embodiment of the present disclosure. The support member 130 may include more than two, such as three, four or five supporting elements is also possible. As shown in FIG. 3a, the two supporting elements 130a, 130b may be evenly or symmetrically disposed around the cylindrical body of the assembly of the first electrode 11, the active part 10 and the second electrode 12 forming a substantially complete circle. As shown in FIGS. 3b and 3c, the supporting member 13 including two supporting elements 130a, 130b and three supporting elements 130a, 130b, 130c, respectively. As another example, FIGS. 3d and 3e show the support member 13 including six supporting elements 130a through 130f. The six supporting elements 130a through 130f depicted in FIG. 3d likewise evenly circumferentially around the cylindrical body of the assembly of the first electrode 11, the active part 10 and the second electrode 12 forming a complete circle. Each supporting element has a curvature in order to substantially conform to the curvature of the cylindrical body.

Figure 4:
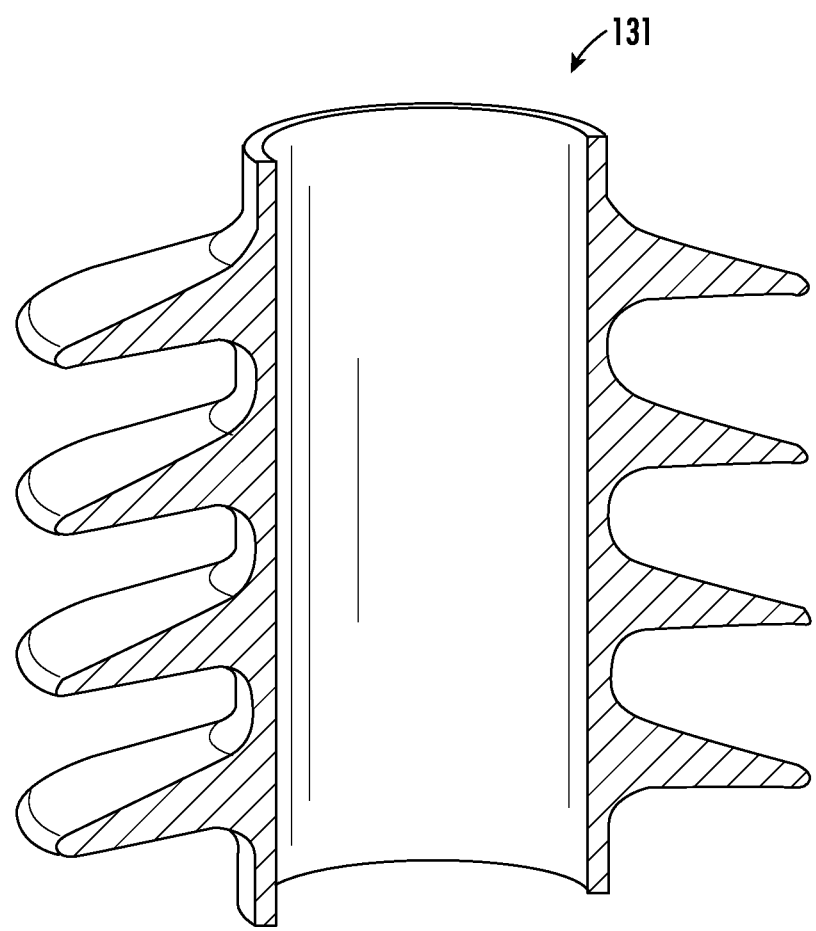
FIG. 4 shows a longitudinal section of an insulating expandable part according to an embodiment of the present disclosure and FIG. 5 shows a longitudinal section of a flexible insulating housing according to an embodiment of the present disclosure.

FIG. 4 shows a longitudinal section of an insulating expandable part according to an embodiment of the present disclosure. As shown in FIG. 4, the outer surface of the insulating expandable part 131 may include several sheds in the form of fins or protrusions pointing outwards in the radial direction. The insulating expandable part 131 is a one-piece component. Such one-piece insulating expandable part 131 can be made of flexible material and fabricated by e.g. injection technique enables a flexible design of the external insulation and a low fabrication cost. For example, the flexible material can be room temperature expandable material which is selected from a group consisting of silicon rubber (SiR), thermoplastic elastomer (TPE), ethylene-popylene-diene monomer rubber, ethylene-vinyl acetate rubber, fluoro-silicones, fluoro-elastomers, flexibilized epoxy resin or any combinations thereof. By example the flexible insulation material also can be a heat shrinkable material, such as polyolefin, ethylene vinyl acetate copolymer, styreneic block copolymer, polyvinyl chloride, polyurethane and other elastomers and rubbers, which is pre-expanded after molding and shrinks upon heating during the assembly process.

For example, the fins or protrusions can be formed as part of the external insulation during a same injection process.

Figure 5:
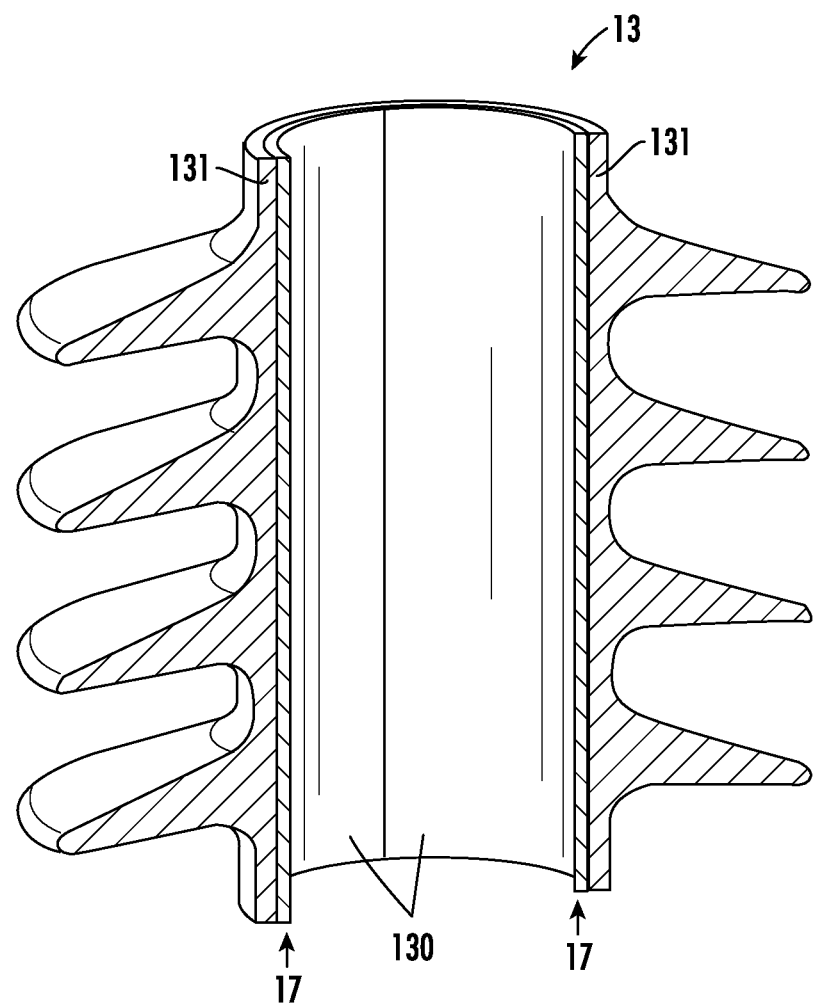

FIG. 5 shows a longitudinal section of a flexible insulating housing according to an embodiment of the present disclosure. As shown in FIGS. 1 and 5, the flexible insulating housing 13 is formed by moulding the insulating expandable part 131 around the support member 130, and the insulating expandable part 131 is spaced apart from the assembly of the first electrode 11, the active part 10 and the second electrode 12. For example, the moulding of the insulating expandable part 131 may use injection-moulding, vacuum casting, and hot pressing.

A first primer layer 17 acting as a bonding layer is uniformly distributed and sandwiched between the outer surface of supporting member 130 and the inner wall of the insulating expandable part 131. In some embodiments, the material of the primer layer 17 is selected from a group consisting of silicone resin SiR, polyurethane, ethylene-vinyl acetate and any combinations thereof.

By having the surge arrester according to an embodiment of the present disclosure, a plurality of the supporting elements of the support member 130 are mechanically connected by the insulating expandable part 131. The expandable material used for the insulating expandable part 131 exhibits a relatively weak mechanical strength and expandable characteristic, providing a path between any two adjacent supporting elements for releasing a radial pressure generated inside the inner space defined by the supporting member 130. The overpressure may be generated due to a high short-circuit current especially for a high voltage system. Besides, the expandable characteristic of the insulating expandable part 131 makes it possible to assemble the two individual parts as the flexible insulating housing 13 and the assembly of the first electrode 11, the active part 10 and the second electrode 12, resulting an increase in the flexibility of the surge arrester manufacture. In particular, because the support elements are mechanically connected by the flexible insulating housing 13, by exerting outwards radial force on the flexible insulating housing 13, the cross-section of its inner space is enlarged, thus making it easier to insert the assembly of the first electrode 11, the active part 10 and the second electrode 12 into the flexible insulating housing 13. When the assembly reaches the desired position, the exertion of the force is stopped and the flexible insulating housing 13 may return to its original shape. Such manufacture process allows to have the two parts ready in the first place, namely the flexible insulating housing 13 and the assembly of the first electrode 11, the active part 10 and the second electrode 12, and then have them assembled so as to get the assembled surge arrester.

Besides the radial pressure, the high short-circuit current may generate a stress in the longitudinal direction 12 of the surge arrester 1, causing an undesirable relative movement between the first electrode 11 and the flexible insulating housing 13 in the longitudinal direction 14. In order to overcome this issue, the first electrode 11 further have a first interlocking part 110, and a second interlocking part 132 is formed on an inner surface of the flexible insulating housing 13. As shown in FIG. 1A, the first interlocking part 110 is arranged at a side of the first electrode 11 facing an inner surface of the flexible insulating housing 13 in a shape of protrusion. For example, the first interlocking part 110 may extend from a body region 111 of the first electrode 11 orthogonal to the longitudinal direction 14 of the serge arrester 1. The body region 111 may refer to an upper, middle or lower region of the side of the first electrode 11. The second interlocking part 132 is arranged on the inner surface of the flexible insulating housing 13 in a shape of recess, so that the first interlocking part 110 may at least partially extend into the flexible insulating housing 13 and mate the second interlocking part 132, thereby providing a fixing region. The protrusion may for example be arranged next to the flexible insulating housing 13 along a circumference and its segments of the first electrode 11. The skilled person should understand that the protrusion may be formed on the inner surface of the flexible insulating housing 13 and the recess may be formed on the first electrode 11 as an alternative solution.

The protrusion on either of the first electrode side and the inner surface of the flexible insulating housing tends to obstruct the path for insertion of the assembly of the first electrode 11, the active part 10 and the second electrode 12 into the flexible insulating housing 13. But thanks to the expandable characteristic of the insulating expandable part 131, during the assembling, the exertion of outwards radial force on the flexible insulating housing 13 can enlarge the cross-section of the flexible insulating housing 13 to avoid that the protrusion impedes the insertion.

As shown in FIG. 1A, a cross-section of the first interlocking part 110 of the first electrode 11 with respect to a cutting plane in parallel with the longitudinal direction 14 of the surge arrester 1 is shaped like a step, and a cross-section of the second interlocking part 132 with respect to a cutting plane in parallel with the longitudinal direction 14 of the surge arrester 1 is shaped like a step, as well. For the corresponding pair of the steps of the first interlocking part 110 and the second interlocking part 132, the fixing region 18 (the dash-line box) impeding their relative movement towards each other in the longitudinal direction 14 of the surge arrester 1. For example, the first interlocking part 110 intends to move against the second interlocking part 132 due to a stress generated from the high short-circuit current in the surge arrester 1, and then it may exert a first press against the second interlocking part 132 via the fixing region 18. In turn, the second interlocking part 132 may exert a second press equal and opposite on the first interlocking part 110, which is helpful to restricting the first electrode 11 in the surge arrester 1.

Figure 1B:
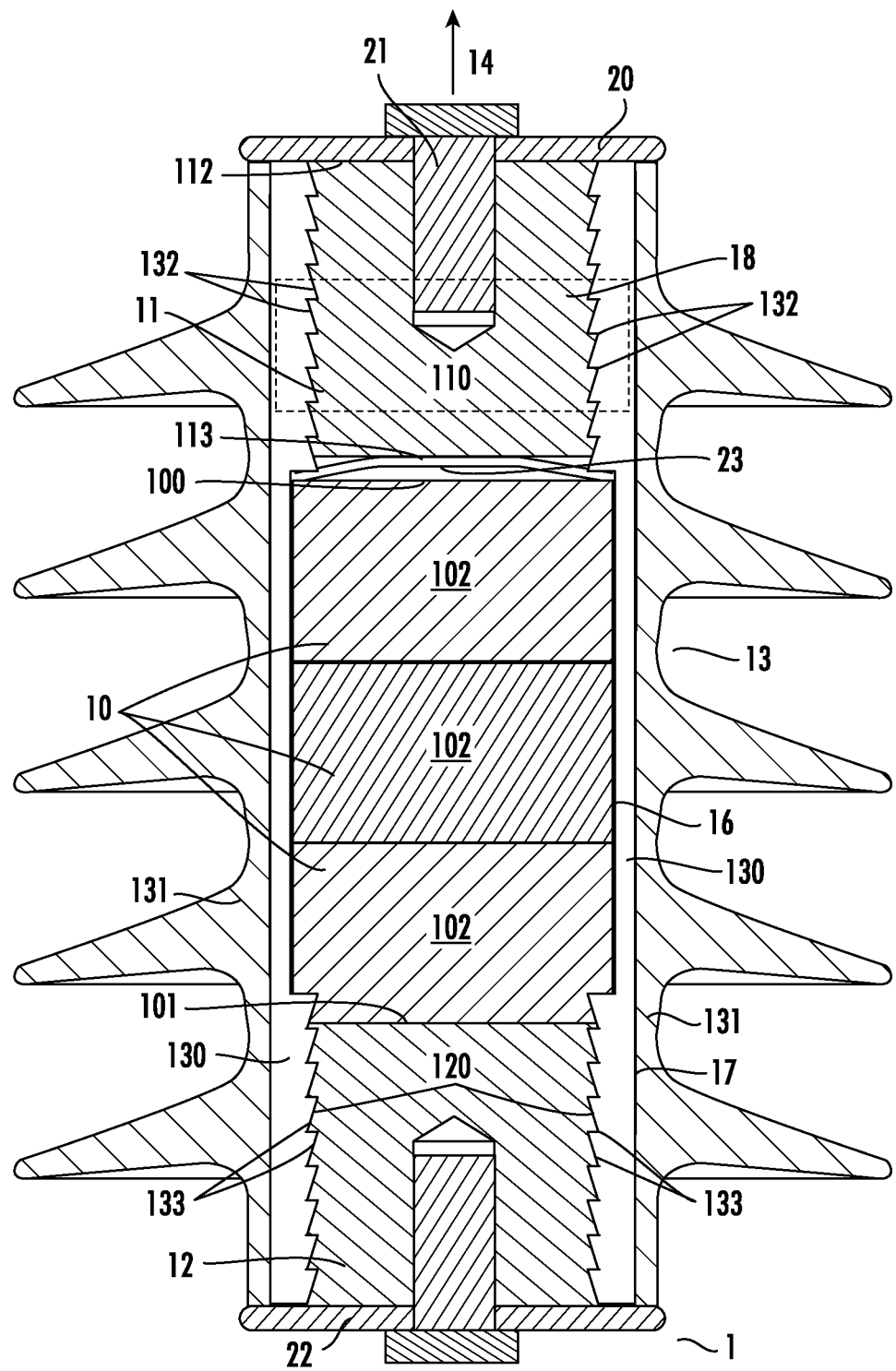
FIGS. 1B and 1C show a longitudinal section of a surge arrester according to another embodiment of the present disclosure.
Figure 1C:
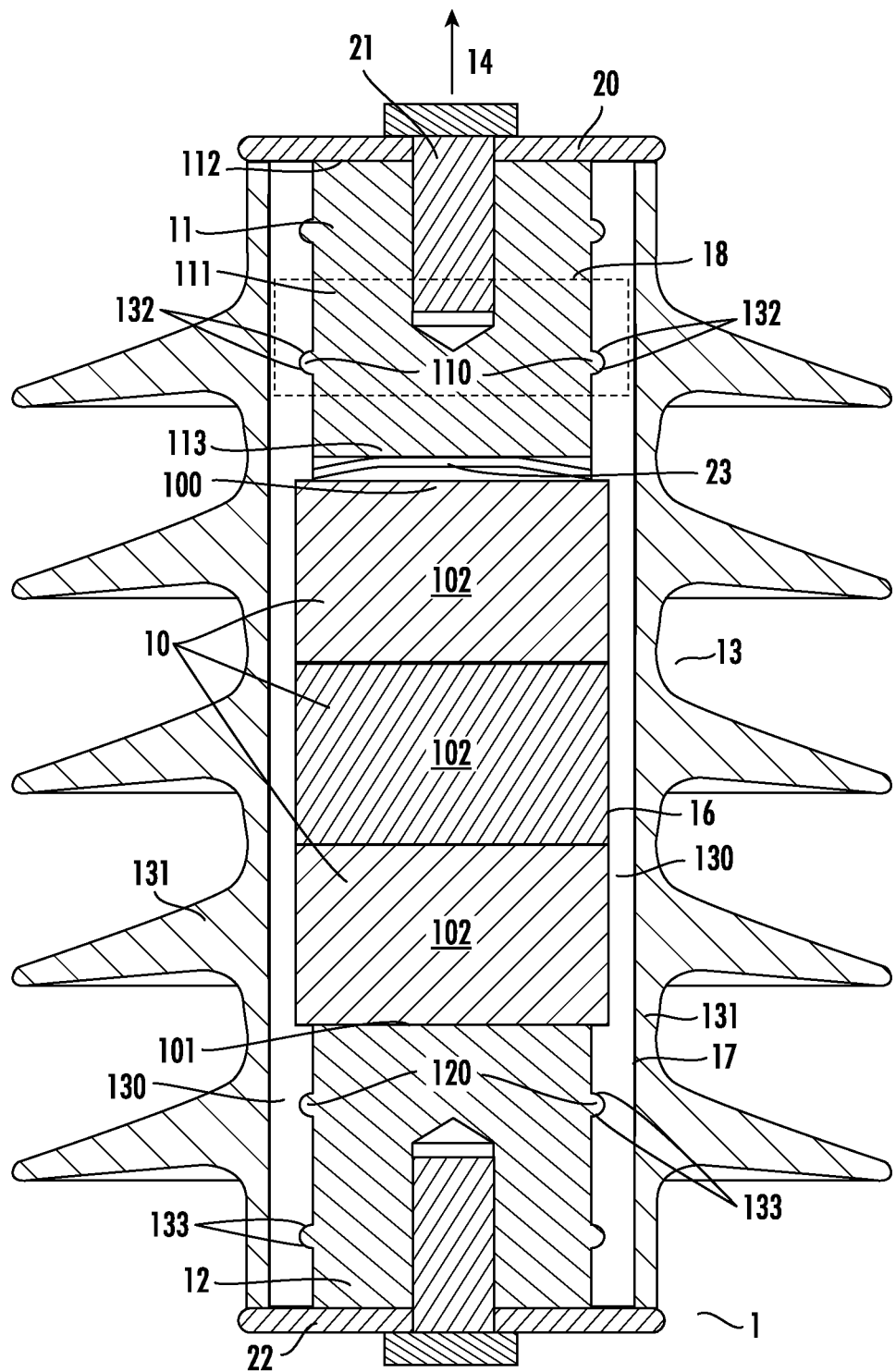

FIGS. 1B and 1C show a longitudinal section of a surge arrester according to another embodiment of the present disclosure. If not stated otherwise, the surge arrester 1 of FIGS. 1B and 1C may comprise the same elements and features as the surge arrester 1 of FIG. 1A. As shown in FIGS. 1B and 1C, a cross-section of the first interlocking part 110 of the first electrode 11 with respect to a cutting plane in parallel with the longitudinal direction 14 of the surge arrester 1 is shaped like a sawtooth or half-cycle, and a cross-section of the second interlocking part 132 with respect to a cutting plane in parallel with the longitudinal direction 14 of the surge arrester 1 is shaped like a sawtooth or half-cycle, as well. For the corresponding pair of the steps of the first interlocking part 110 and the second interlocking part 132, the fixing region 18 impeding their relative movement towards each other in the longitudinal direction 14 of the surge arrester 1.

Figure 1D:
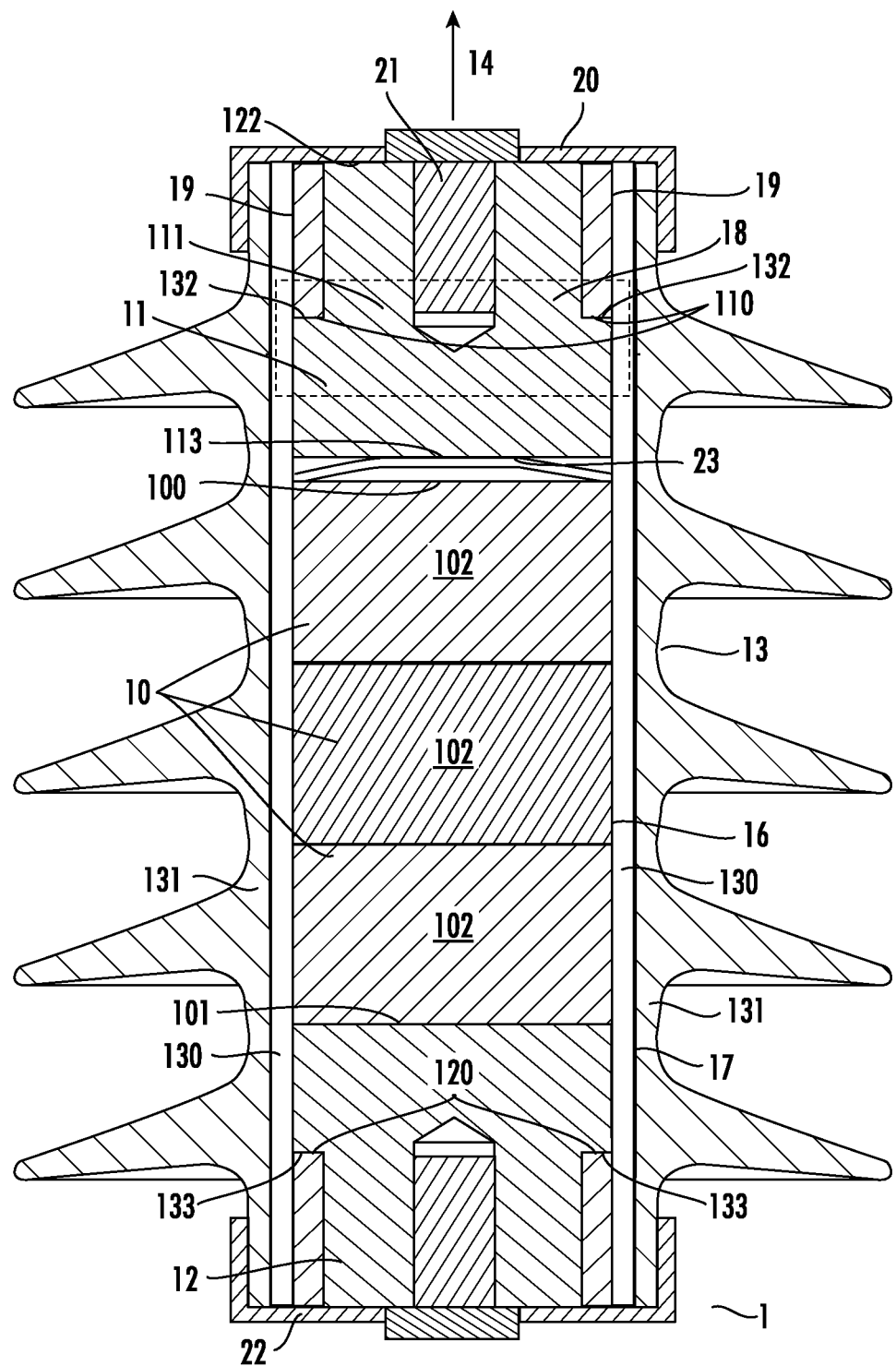
FIG. 1D shows a longitudinal section of a surge arrester according to another embodiment of the present disclosure.

FIG. 1D shows a longitudinal section of a surge arrester according to another embodiment of the present disclosure. If not stated otherwise, the surge arrester 1 of FIG. 1D may comprise the same elements and features as the surge arrester 1 of FIG. 1A. As shown in FIG. 1D, the first electrode 11 includes a first terminal 112 and a second terminal 113 opposing to each other in the longitudinal direction 14 of the surge arrester 1. The second terminal 113 of the first electrode 11 is arranged to rest against the first end 100 of the active part 10, giving the fixing region 18.

The first interlocking part 110 is shaped in a flange on the first terminal 112 of the first electrode 11. The first electrode 11 has a rim at its first terminal 112 with its axis in the longitudinal direction 14 of the surge arrester, providing the flange-shaped first interlocking part 110. The second interlocking part 132 may be bonded by a first adhesive layer 19 with the inner surface of the flexible insulating housing 13 and be configured to press against the flange of the first interlocking part 110 of the first electrode 11. The second interlocking part 132 is in a shape of a ring or a multiple of segments of a ring with axis in the longitudinal direction 14 of the surge arrester 1. Consequently, the flange-shaped first interlocking part 110 and the ring-shaped (or ring-segment-shaped) second interlocking part 132 are arranged co-axially, giving the fixing region 18.

In some embodiments, the ring-shaped (or ring-segment-shaped) second interlocking part 132 is made of a composite material the same with that of the support member 130. Therefore, the first adhesive layer 19, when its material is appropriately selected, such as acrylate and modified acrylate resin (urethane acrylate, cyanoacrylate), amino resin, epoxy resin, melamine-formaldehyde resin, phenolic formaldehyde resin, polyvinyl acetate, polyurethane and vinyl ester resin, will apply the same strong adhesive bond with either of the ring-shaped (or ring-segment-shaped) second interlocking part 132 and the support member 130. During the manufacturing process, the ring-shaped (or ring-segment-shaped) second interlocking part 132 may be bonded with the support member 130 by the application of the first adhesive layer 19 subsequent to insertion of the assembly of the first electrode 11, the active part 10 and the second electrode 12 into the flexible insulating housing 13. This is helpful for reducing the complexity of the manufacturing process while keeping a strong interlocking mechanism between the first electrode 11 and the flexible insulating housing 13. As an alternative, the ring-shaped (or ring-segment-shaped) second interlocking part 132 may be moulded on the flange-shaped first interlocking part of the first electrode 11. In addition, when using the ring-segment-shaped second interlocking part 132, it may be added to the flexible insulating housing 13. Since the ring segments are separately arranged, each of them may be move radially with the expansion of the flexible insulating housing 13. This gives more flexibility of the manufacturing process where the ring segments may be integrated with the housing before the insertion of the assembly of the first electrode 11, the active part 10 and the second electrode 12.

As shown in FIG. 1A, the active part 10 of the surge arrester 1 comprises a plurality of varistor elements 102. The varistor elements 102 may be disk-like and/or substantially circular cylindrically shaped blocks of metal-oxide based material, e.g. ZnO based material. Therein, each varistor element 102 may comprise a plurality of disk-like and/or substantially circular cylindrical varistor sub-elements stacked on top of each other in longitudinal direction 14 to form a single varistor element. The varistor elements 102 are arranged coaxially to the longitudinal direction 14 of the surge arrester 1 in a stack along the longitudinal direction 14. In order to ensure proper electrical and/or thermal contact between the varistor elements 102 and parts/elements of the surge arrester 1 adjoining the varistor elements 102 in the longitudinal direction 14, the varistor elements 102 may further comprise a conductive layer on at least one abutting face and/or abutting side. The at least one abutting face may denote an outer surface of the varistor element 102 having a surface normal vector directed parallel or antiparallel to the longitudinal direction 14. The conductive layer may e.g. be an aluminium film sprayed on the respective surface and/or any other appropriate metallization. Further, a circumferential and/or peripheral surface of the varistor elements 102 may be passivated by appropriate passivation means and/or an appropriate passivation layer.

The active part 10 further comprises a spring element 23, which may be formed as disk-like and/or substantially circular cylindrical metal sheets and/or metal blocks. The spring element 23 may also be Bellville washer spring, plate spring and so on. The spring element 23 may e.g. be manufactured from aluminium, metal, and/or an alloy. The spring element 23 is arranged between the first electrode 11 and the active part 10 in the longitudinal direction 14. As alternative, the spring element 23 may be arranged between two separate parts of the first electrode 11 in the longitudinal direction 14 of the surge arrester 1. It is noted here that in various other embodiments of the disclosure, the spring element 23 may not be provided. Thus, the spring element 23 may generally be considered optional. The spring element is helpful for providing an axial length tolerances so as to overcome a misalignment between the first interlocking part 110 and second interlocking part 132 in the longitudinal direction 14. Besides, the arrangement of metal spring element 23 ensures that an over-voltage transient may be reliably conducted between the first electrode 11 and the active part 10 or between the two separate parts of the first electrode 11.

As shown in FIG. 1A, for further fixation and/or protection of the assembly of the first electrode 11, the active part 10 and the second electrode 12, the surge arrester 1 further includes a first electrode cap 20 mechanically and electrically connected to the first electrode 10, being arranged to mechanically cover or encompass or crimp at least a portion of an outer surface of the flexible insulating housing 13 at the first electrode 11. In some embodiments, the first electrode cap 20 may be made of conductive metal, allowing the leakage path leading to the outside of the surge arrester 1 where an arc occurs therein. The attachment element 21 may for instance be a bolt, a rivet, or a screw arranged along the longitudinal direction 14 and at least partially engaging a correspondingly formed cavity or recess of the first electrode 11. Accordingly, the cavities may comprise a thread, in which the attachment elements 21 may be screwed. Alternatively or additionally the attachment elements 21 may be held in the cavities by form fit and/or friction fit. By having the first electrode cap, the radial expansion of the flexible insulating housing 13 caused by the high short-circuit current may be counter balanced, and consequently the interlocking mechanism in the longitudinal direction 14 may be retained. In addition, with the help of the attachment element, the electrode 11 may be pulled out allowing its separation from the active part 10. This renders an easy dissembling of the surge arrest for reparation or maintenance. With similar arrangement, a second electrode cap 22 may be provided at the other side of the surge arrester 1.

In some embodiments, stripes of thin tape for aligning the first electrode, the active part and the second electrode in the assembly, being arranged in the longitudinal direction of the surge arrester or tilted by a predetermined angle from the same. They are helpful for aligning varistor elements 102.

As shown in FIG. 1A, the second electrode 12 may have a third interlocking part 120, and a fourth interlocking part 133 is formed on an inner surface of the flexible insulating housing 13. The third interlocking part 120 and the fourth interlocking part 133 are arranged to the opposite side of the first interlocking part 110 and second interlocking part 132 with respect to the longitudinal direction 14. The structure and shape, and materials of the first interlocking part 110 and second interlocking part 132 may apply to the third interlocking part 120 and the fourth interlocking part 133. In addition, the interlocking mechanism involving the first interlocking part 110 and second interlocking part 132 may be retained between the third interlocking part 120 and the fourth interlocking part 133. For avoidance of redundancy, detailed description is omitted here.

It is noted here that in various other embodiments of the disclosure, the third interlocking part 120 and the fourth interlocking part 133 may not be provided.

As shown in FIG. 1A, a portion of the insulating expandable part 131 adjacent to the first electrode or the second electrode may be replaced by a retaining ring, and the retaining ring is configured to crimp a portion of the support member. This is helpful for reinforce the mechanical strength of the flexible insulating housing 13.

A manufacturing process for the surge arrester is provided as below according to another embodiment of the present disclosure. The insulating expandable part 131 is moulded around the support member 130 so as to form the flexible insulating housing 13. The flexible insulating housing 13 is expanded in its radial direction. The assembly of the first electrode 11, the active part 10 and the second electrode 12 is inserted into the expanded flexible insulating housing 13 in the longitudinal direction 14 of the surge arrester 1. The expanded flexible insulating housing 13 is released so that it is arranged around the assembly of the first electrode 11, the active part 10 and the second electrode 12.

As an alternative manufacturing process, the support member 130 is arranged around the assembly of the first electrode 11, the active part 10 and the second electrode 12. The insulating expandable part 131 is moulded around the support member 130.

In some embodiments, the above two manufacturing processes may further include steps of arranging the primer layer 17 between the support member 130 and the insulating expandable part 131 for bonding the same, arranging an adhesive layer 19 bonding the assembly of the first electrode 11, the active part 10 and the second electrode 12 and the support member 130, and/or arranging stripes of thin tape for aligning the first electrode, the active part and the second electrode.

Though the present disclosure has been described on the basis of some embodiments, those skilled in the art should appreciate that those embodiments should by no way limit the scope of the present disclosure. Without departing from the spirit and concept of the present disclosure, any variations and modifications to the embodiments should be within the apprehension of those with ordinary knowledge and skills in the art, and therefore fall in the scope of the present disclosure which is defined by the accompanied claims.

The invention claimed is:

1. A surge arrester, comprising:
an active part extending along a longitudinal direction of the surge arrester;
a first electrode arranged to rest against a first end of the active part, the first electrode having a first interlocking part arranged at a side of the first electrode facing an inner surface of the flexible insulating housing in a shape of a protrusion;
a second electrode resting against a second end of the active part, wherein the second end opposes the first end in the longitudinal direction of the surge arrester;
a flexible insulating housing, being arranged around an assembly of the first electrode, the active part and the second electrode; and
a second interlocking part formed on an inner surface of the flexible insulating housing, the second interlocking part arranged on the inner surface of the flexible insulating housing in a shape of a recess;
the first interlocking part of the first electrode arranged to fit with the second interlocking part of the flexible insulating housing for preventing relative movement of the first electrode and the flexible insulating housing in the longitudinal direction of the surge arrester; and
the flexible insulating housing including:
a support member mechanically connecting and supporting the assembly of the first electrode, the active part and the second electrode, which has a plurality of supporting elements being arranged parallel to the longitudinal direction of the surge arrester and being arranged laterally at sides of the assembly of the first electrode, the active part and the second electrode; and
an insulating expandable part with a plurality of sheds extending outwards, being moulded around the support member to mechanically connect the plurality of supporting elements, the insulating expandable part being spaced apart from the assembly of the first electrode, the active part and the second electrode.

2. The surge arrester according to claim 1, wherein:
a cross-section of the first interlocking part of the first electrode with respect to a cutting plane in parallel with the longitudinal direction of the surge arrester is shaped like at least one of a step, a sawtooth, and a half-cycle; and
a cross-section of the second interlocking part with respect to a cutting plane in parallel with the longitudinal direction of the surge arrester is shaped like a at least one of a step, a sawtooth, and a half-cycle.

3. The surge arrester according to claim 1, wherein:
the first electrode includes a first terminal and a second terminal opposing to each other in the longitudinal direction of the surge arrester;
the second terminal of the first electrode is arranged to rest against the first end of the active part;
the first interlocking part is shaped in a flange on the first terminal of the first electrode; and
the second interlocking part, being bonded by a first adhesive layer with the inner surface of the flexible insulating housing and being configured to press against the flange of the first interlocking part of the first electrode.

4. The surge arrester according to claim 3, wherein:
the second interlocking part is made of a composite material the substantially same with that of the support member.

5. The surge arrester according to claim 3, wherein:
the second interlocking part is moulded on the first interlocking part of the first electrode.

6. The surge arrester according to claim 3, wherein:
the second interlocking part is in a shape of a ring with axis in the longitudinal direction of the surge arrester.

7. The surge arrester according to claim 1, further including:
a spring element being arranged along the longitudinal direction of the surge arrester.

8. The surge arrester according to claim 7, wherein the spring element is a disk spring.

9. The surge arrester according to claim 1, wherein:
the support member comprises a material selected from a group consisting of thermoplastic material, duroplast-based FRP material, unidirectional, tape or filament wound reinforced duro-or thermoplast material, and any combinations thereof; and
the insulating expandable part comprises room temperature expandable material which is selected from a group consisting of silicon rubber (SiR), thermoplastic elastomer (TPE), ethylene-popylene-diene monomer rubber, ethylene-vinyl acetate rubber, fluoro-silicones, fluoro-elastomers, flexibilized epoxy resin, and any combinations thereof.

10. The surge arrester according to claim 1, further including:
a first primer layer, being arranged between the support member and the insulating expandable part for bonding the support member and the insulating expandable part.

11. The surge arrester according to claim 1, further including:
an adhesive layer bonding the assembly of the first electrode, the active part and bonding the second electrode and the support member.

12. The surge arrester according to claim 1, further including:
stripes of tape for aligning the first electrode, the active part and the second electrode in the assembly, being arranged in the longitudinal direction of the surge arrester.

13. The surge arrester according to claim 1, further including:
an electrode cap mechanically and electrically connected to the first electrode or the second electrode, being arranged to mechanically cover at least a portion of an outer surface of the flexible insulating housing at the first electrode or the second electrode.

14. The surge arrester according to claim 13, wherein:
a screw, being configured to fasten the first electrode cap and the first electrode.

15. The surge arrester according to claim 1 wherein:
the active part includes a plurality of metal-oxide-resistor blocks stacked in the longitudinal direction of the surge arrester.

16. A method for manufacturing a surge arrester according to claim 1, the method including:
moulding the insulating expandable part around the support member to mechanically connect the plurality of supporting elements of the support member;
expanding the flexible insulating housing;
inserting the assembly of the first electrode, the active part and the second electrode into the expanded flexible insulating housing in a longitudinal direction of the surge arrester; and
releasing the expanded flexible insulating housing so that it is arranged around the assembly of the first electrode, the active part and the second electrode.

17. The method according to claim 16, further including:
arranging a primer layer between the support member and the insulating expandable part for bonding the support member and the insulating expandable part.

18. The method according to claim 16, further including:
arranging an adhesive layer bonding the assembly of the first electrode, the active part and bonding the second electrode and the support member.

19. A method for manufacturing a surge arrester according to claim 1, including:
arranging the support member around the assembly of the first electrode, the active part and the second electrode; and
moulding the insulating expandable part around the support member.

* * * * *